(12) United States Patent
Berger et al.

(10) Patent No.: US 8,981,255 B2
(45) Date of Patent: Mar. 17, 2015

(54) METHOD FOR FIXING A CONNECTING ELEMENT ON A WORKPIECE AND COMPONENT COMPRISING A WORKPIECE WITH A CONNECTING ELEMENT FIXED ON IT

(75) Inventors: Franz Berger, Sonthofen (DE); Daniel Burtsche, Buchenberg (DE); Jürgen Meyer, Kempten (DE); Sven Schreiner, München (DE)

(73) Assignee: 3M Innovative Properties Company, St. Paul, MN (US)

( * ) Notice: Subject to any disclaimer, the term of this patent is extended or adjusted under 35 U.S.C. 154(b) by 954 days.

(21) Appl. No.: 12/988,650

(22) PCT Filed: Jul. 15, 2008

(86) PCT No.: PCT/EP2008/005773
§ 371 (c)(1),
(2), (4) Date: Oct. 20, 2010

(87) PCT Pub. No.: WO2009/132684
PCT Pub. Date: Nov. 5, 2009

(65) Prior Publication Data
US 2011/0039119 A1 Feb. 17, 2011

(30) Foreign Application Priority Data
Apr. 30, 2008 (DE) .......................... 10 2008 021 636

(51) Int. Cl.
B23K 26/00 (2014.01)
B23K 33/00 (2006.01)
(Continued)

(52) U.S. Cl.
CPC ............ B23K 26/22 (2013.01); B23K 11/0033 (2013.01); B23K 11/11 (2013.01); B23K 26/063 (2013.01); F16B 2/005 (2013.01)
USPC ............. 219/121.63; 219/121.64; 219/137 R; 428/59; 428/552; 228/248.5

(58) Field of Classification Search
CPC .... B23K 11/0033; B23K 11/11; B23K 26/22; B23K 26/063; F16B 2/005
USPC ........ 219/121.63, 121.64, 117.1, 118, 137 R, 219/121.8; 428/552, 594, 565, 546, 548, 428/551, 43–45, 47–49, 51–63, 64.1, 66.2, 428/66.4, 67, 68, 75, 77, 78, 80, 81, 82, 83, 428/84, 85, 86, 87; 228/248.5, 112.1, 113, 228/114.5, 175, 178, 248.1, 107, 115, 117, 228/121, 126, 198, 208, 212, 213, 225, 226, 228/234.3, 2; 51/297, 298, 307, 309
See application file for complete search history.

(56) References Cited

U.S. PATENT DOCUMENTS 3,681,561 A * 8/1972 Okano .............................. 219/80
3,844,019 A * 10/1974 Shwayder et al. .............. 419/61
(Continued)

FOREIGN PATENT DOCUMENTS

DE 000961038 * 4/2002

OTHER PUBLICATIONS

Form PCT/IB/338 (Notification of Transmittal of Translation of the International Preliminary Report on Patentability (Chapter I or Chapter II of the Patent Cooperation Treaty)) for International Application No. PCT/EP2008/005773, with a mailing date of Nov. 18, 2010, one (1) page.

(Continued)

Primary Examiner — Dana Ross
Assistant Examiner — Gyounghyun Bae
(74) Attorney, Agent, or Firm — Nath, Goldberg & Meyer; Jerald L. Meyer; Katelyn J. Bernier

(57) ABSTRACT

Provided herein is a method for securely fixing a connecting element on a metal workpiece by welding involving the formation of locally confined weld points that permits the friction-increasing, play-free, reversible connection of joined workpieces for applications in assembly and transportation. The connecting element includes a metal foil having hard material particles fixed on the joining surfaces by a metallic binding layer. Similarly, a component having a metal workpiece and the connecting element, which is suitable for the connection of workpieces to be joined in machine, plant, and motor vehicle construction, is also provided.

18 Claims, 4 Drawing Sheets

Figure 1A:
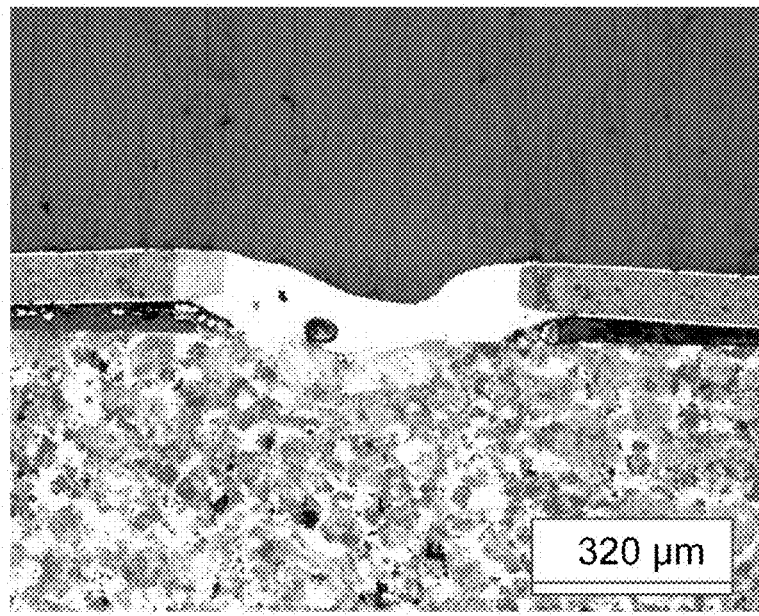
Figure 1B:
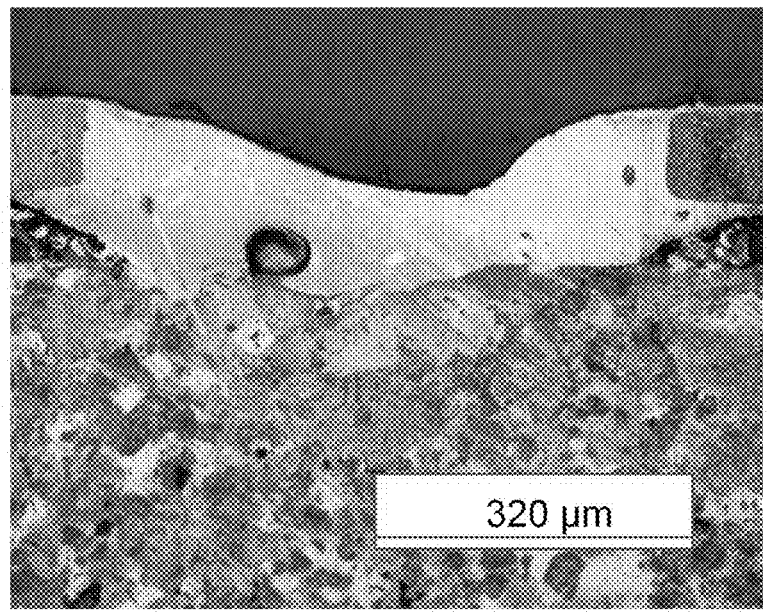

Microtomed section of laser welding (lap joint) in 100 and 200 fold magnification

(51) Int. Cl.
*B23K 35/30* (2006.01)
*B32B 3/00* (2006.01)
*B22F 5/00* (2006.01)
*B22F 7/00* (2006.01)
*B23K 31/00* (2006.01)
*B23K 26/22* (2006.01)
*B23K 11/00* (2006.01)
*B23K 11/11* (2006.01)
*B23K 26/06* (2014.01)
*F16B 2/00* (2006.01)

(56) References Cited

U.S. PATENT DOCUMENTS

| | | | |
|---|---|---|---|
| 4,032,743 A * | 6/1977 | Erbach et al. | 219/121.7 |
| 4,435,480 A * | 3/1984 | Mizuhara | 428/548 |
| 4,547,652 A * | 10/1985 | Raisig et al. | 219/121.64 |
| 4,685,202 A * | 8/1987 | Booth et al. | 29/607 |
| 4,750,667 A * | 6/1988 | Takahashi et al. | 228/178 |
| 4,853,182 A * | 8/1989 | Cornie et al. | 420/129 |
| 4,865,806 A * | 9/1989 | Skibo et al. | 420/129 |
| 4,883,638 A * | 11/1989 | Blankenhagen et al. | 419/9 |
| 5,024,899 A * | 6/1991 | Lang | 428/550 |
| 5,083,697 A * | 1/1992 | Difrancesco | 228/116 |
| 5,124,118 A * | 6/1992 | Youssef et al. | 419/9 |
| 5,183,632 A * | 2/1993 | Kiuchi et al. | 419/48 |
| 5,268,556 A * | 12/1993 | Coyle et al. | 219/121.76 |
| 5,330,849 A * | 7/1994 | Kennedy et al. | 428/552 |
| 5,348,210 A * | 9/1994 | Linzell | 228/115 |
| 5,519,191 A * | 5/1996 | Ketcham et al. | 219/552 |
| 5,803,967 A * | 9/1998 | Plano et al. | 117/102 |
| 5,837,066 A * | 11/1998 | Linzell | 148/22 |
| 6,103,992 A * | 8/2000 | Noddin | 219/121.71 |
| 6,308,882 B1 * | 10/2001 | Shuster et al. | 228/175 |
| 6,372,320 B1 * | 4/2002 | Schumi et al. | 428/67 |
| 6,448,184 B1 * | 9/2002 | Zimmer et al. | 438/706 |
| 6,534,194 B2 * | 3/2003 | Weihs et al. | 428/635 |
| 6,572,962 B2 * | 6/2003 | Hodjat | 428/323 |
| 6,875,949 B2 * | 4/2005 | Hall | 219/121.64 |
| 7,153,567 B1 * | 12/2006 | Akedo et al. | 428/323 |
| 7,315,009 B2 * | 1/2008 | Fujimoto et al. | 219/121.64 |
| 2002/0114950 A1 * | 8/2002 | Akimoto et al. | 428/403 |
| 2007/0009757 A1 * | 1/2007 | Takayama et al. | 428/644 |
| 2007/0071907 A1 * | 3/2007 | Stiles et al. | 427/554 |
| 2007/0272665 A1 * | 11/2007 | Becker et al. | 219/121.64 |
| 2008/0053000 A1 * | 3/2008 | Palmgren et al. | 51/297 |
| 2011/0039119 A1 * | 2/2011 | Berger et al. | 428/552 |

OTHER PUBLICATIONS

English translation of the International Preliminary Report on Patentability (Chapter I of the Patent Cooperation Treaty), issued Nov. 9, 2010, for International Application No. PCT/EP2008/005773, six (6) pages.

* cited by examiner

Microtomed section of laser welding (lap joint) in 100 and 200 fold magnification Microtomed section of laser welding (lap joint) in 500 and 1000 fold magnification Microtomed section of laser welding (corner joint) in 100 and 200 fold magnification

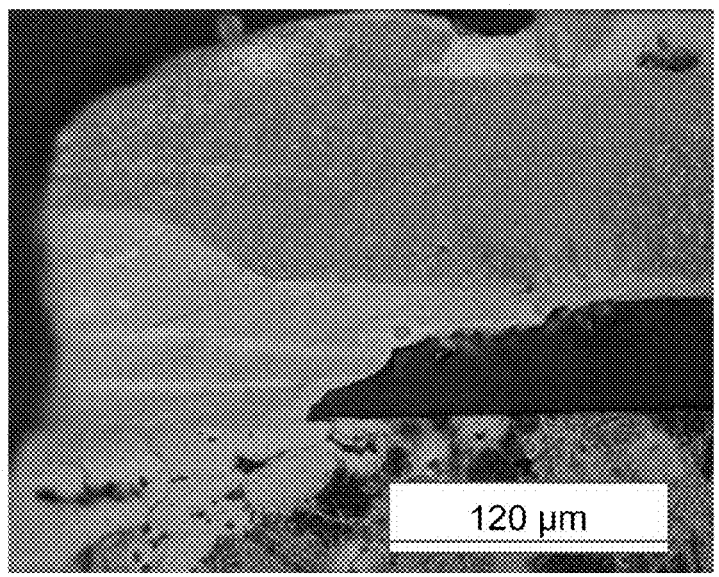
Figure 2c: Microtomed section of laser welding (corner joint) in 500 fold magnification

METHOD FOR FIXING A CONNECTING ELEMENT ON A WORKPIECE AND COMPONENT COMPRISING A WORKPIECE WITH A CONNECTING ELEMENT FIXED ON IT

This is a National Phase Application filed under 35 U.S.C. §371 as a national stage of PCT/EP2008/005773, filed on Jul. 15, 2008, claiming the benefit of German Patent Application 10 2008 021 636.4, filed on Apr. 30, 2008, the content of each of which is hereby incorporated by reference in its entirety.

FIELD OF THE INVENTION

The invention relates to a method for fixing on a workpiece a connecting element which permits the friction-increasing, play-free, reversible connection of workpieces to be joined, and relates to a component, comprising a metal workpiece and a connecting element fixed on it securely for purposes of assembly and transportation by locally confined weld points. Such components are suitable for the force-locked, friction-increasing, play-free, reversible connection of workpieces to be joined.

BACKGROUND OF THE INVENTION

Force-locked connections are frequently used in all areas of machine, plant and motor vehicle construction for the transmission of transverse forces or torques. The size of the force which can be respectively transmitted depends not only on the structural design but also primarily on the static friction value (coefficient of static friction) of the component surfaces connected to one another. Therefore, in the case of such force-locked connections, it is endeavored to provide friction-increasing measures that allow the greatest possible transverse forces and torques to be transmitted safely. Further, force-locked connections may also be referred to as non-positive connections.

PRIOR ART

It is known to use friction-increasing interlayers to increase the holding forces in screwed and clamped connections. EP 0 961 038 B1 discloses a connecting element for the friction-increasing play-free reversible connection of workpieces to be joined. The connecting element comprises a spring-elastic steel foil which bears on its surface particles of a defined size, which are fixed on the spring-elastic foil by means of a binder phase. The particles consist of a hard material, preferably of diamond, cubic boron nitride, aluminum oxide, silicon carbide or boron carbide. The intrinsic strength of the foil at least matches the intrinsic strength of the workpieces to be joined and the binder phase has a strength which corresponds at least to that of the surfaces of the workpieces that are to be joined.

During the assembly of the connecting elements described in EP 0 961 038 B1, however, several problems can arise. A common embodiment of the friction-increasing connecting element from EP 0 961 038 B1 is in the form of punched, planar rings or disks which are manually inserted during the assembly of the respective non-positive connection. This operation is laborious and also entails the risk of such an insert—which is usually only about 0.1 mm thin—getting lost unnoticed before the connection is finally put together.

Pre-assembly when the components are delivered is not possible in the case of the connecting element according to EP 0 961 038 B1. The connecting element corresponding to EP 0 961 038 B1 is also scarcely distinguishable with the naked eye from blank metal components, since about 90% of the surface consists of chemical nickel. It is therefore sometimes difficult for the assembly personnel to detect the actual presence of the connecting element that is essential for the operational safety of the connection as a whole. This may have considerable associated safety risks. In the case of motor vehicle engines, for example, gear wheels in the crankshaft-camshaft drive system are assembled with such connecting elements.

The failure of the screwed connection that is conventionally used here can lead to spontaneous total engine failures.

An attempted solution is that of adhesively bonding the connecting element on one of the joining surfaces of the workpieces to be connected. This requires surfaces that are absolutely clean, free from oil and dry, which can only be ensured with great effort in engine construction. Remains of adhesive also impair the characteristic force transmission mechanism of the friction-increasing interlayers according to EP 0 961 038 and make it more difficult in the event of a repair to re-assemble an intentionally disconnected connection.

To be able to satisfy the requirements with respect to preventing loss of the connecting element, DE 101 47 627 A1 proposes a connecting element which has a component surface which lies outside the joining surfaces of the connecting element and is formed in such a way that it has an elastic or resilient property which permits reversible fixing of the connecting element on a workpiece to be joined. The component surface preferably takes the form of lugs or clamping lobes protruding from the joining surface. With these connecting elements, manual pre-assembly is possible.

However, the solution proposed in DE 101 47 627 A1 has the disadvantage that the handling of the connecting elements with the protruding lugs/clamping lobes is difficult, giving rise to a risk of damage during the unavoidable handling steps in the production process as a whole and the subsequent logistical and assembly-related processes. Moreover, the increased space requirement during the coating process and also during packing and transportation causes higher costs for the connecting element.

DE 100 45 031 A1 discloses a welded connection of ductile iron to steel, such as for example a steering fork of ductile iron to a steel tube material, in which a metal material is applied as a welding filler between a first component of ductile iron and a second component of steel. The metal material contains nickel with a concentration between 22 and 32%. A friction welding method or a laser welding method is used here as the welding method. In the case of the friction welding method, nickel-based spray overcoatings are first applied before the components are connected. In the case of the laser welding method, uncoated parts are connected by means of laser welding to a self-flowing material which contains approximately 70% nickel. In the case of the methods described in DE 100 45 031 A1, a weld seam or bead zone occurs along the connecting surface. However, such weld seams or bead zones on component surfaces would impair the non-positive connection of such components in a disadvantageous way.

Object of the Invention

The invention is therefore based on the object of permitting the fixing of a friction-increasing connecting element known per se securely for purposes of assembly and transportation while overcoming the disadvantages of the prior art, it also being intended to permit automated assembly of the connecting element without impairing the functional properties of the connecting element, that is to say to provide a force-locked, friction-increasing, play-free, reversible connection of workpieces.

SUMMARY OF THE INVENTION

The above object is achieved according to the invention by a method for fixing a connecting element on a metal workpiece, a component comprising a metal workpiece and a connecting element fixed on it, and the use of such a component. Advantageous or particularly expedient refinements of the subject matter of the application are further specified herein.

The subject matter of the invention is consequently a method for fixing on a metal workpiece a connecting element which permits the friction-increasing, play-free, reversible connection of workpieces to be joined, the connecting element comprising a metal foil which bears on its joining surfaces hard material particles, which are fixed on the metal foil by means of a metallic binding layer, which method is characterized in that the connecting element is fixed on the metal workpiece securely for purposes of assembly and transportation by welding involving the formation of locally confined weld points.

The subject matter of the invention is similarly a component, comprising a metal workpiece and a connecting element fixed on it securely for purposes of assembly and transportation by locally confined weld points, the connecting element permitting the friction-increasing, play-free, reversible connection of workpieces to be joined and comprising a metal foil which bears on its joining surfaces hard material particles, which are fixed on the metal foil by means of a metallic binding layer.

The subject matter of the invention is similarly the use of a component according to the invention for the force-locked, friction-increasing, play-free, reversible connection of workpieces to be joined in machine, plant and motor vehicle construction.

The method according to the invention for fixing a connecting element allows the use of planar components, which are also less susceptible to damage in the various handling steps that are required during the production process, by contrast with DE 101 47 627 A1 with the "clamping lobes" protruding from the plane, with which there is the risk of damage during the handling steps in the production process and during transportation.

Furthermore, the solution according to the invention provides the connecting elements with an advantage in transportation, since, by contrast with DE 101 47 627 A1, the connecting element used according to the invention is configured as a space-saving flat disk.

The connecting element is fixed securely against loss with greater security than in the case of DE 101 47 627 A1 and by contrast with EP 0 961 038 B1.

As a difference from EP 0 961 038 B1 and DE 101 47 627 A1, automated assembly of the two workpieces to be connected is possible with the connecting element fixed according to the invention. Similarly, the fixing method itself can also be automated, so that altogether automated assembly of the connecting element is possible, as a difference from EP 0 961 038 B1 and DE 101 47 627 A1.

The welding of nickel layers containing diamond or hard material is not known in the prior art. Since very high temperatures can occur locally during welding on the workpiece surfaces, there is the risk of the hard materials oxidizing and the nickel/hard material layers being locally destroyed by the welding. It has surprisingly been found according to the invention that, although this destruction of the layer occurs locally, it can be limited to a very confined area in a controllable manner. In addition, an increase in the friction values has even surprisingly been observed with the connecting elements fixed according to the invention in comparison with the conventionally inserted connecting elements, this increase being of an order of magnitude of approximately 10% and being accompanied by a lower standard deviation of the friction values. This leads to greater certainty in terms of the process in the applications.

DETAILED DESCRIPTION OF THE INVENTION

According to the invention, the connecting element is fixed on a metal workpiece securely for purposes of assembly and transportation by welding involving the formation of locally confined weld points.

The following requirements for the welding methods or welding locations used according to the invention must be satisfied in order to ensure the functioning of the connecting element or the friction foil during use:

There must not be any functional restriction of the friction-value-increasing layer by any elevations of the joining material between the elements undergoing friction in the joint or excessive deformations of the disk itself.

The strength of the welded connection or the weld points must be chosen such that securement during transportation and assembly is ensured before assembly, even over a relatively long time period and a relatively great distance, and that relatively frequent opening and screwing together again of the subassembly does not lead to loss of the friction foil (assured prevention of loss). At the same time, the required minimum values for the strength are dependent on the material pairings of the friction foil/base material of the metal workpiece.

The metallic binding layer, in particular the layer of chemical nickel with the embedded hard material particles, must not be contaminated by byproducts or auxiliaries.

On the basis of its dimensions, the region of influence of the joint should be in the micro range and be below 5% in relation to the functional area as a whole, preferably well below 5%. In cases of greater dimensioning, structural adaptations must be made.

The welding process should allow itself to be automated, while a high cycle rate and at the same time great certainty in terms of the process and a high level of reproducibility should be possible.

According to the invention, all methods that make it possible to carry out locally confined welds or to set exactly localized weld points come into consideration as welding methods. In particular, laser welding and resistance welding come into consideration here, laser welding being preferred.

Nd:YAG solid-state laser welding units are used with preference for the preferred laser welding.

Pulsed lasers with a wavelength between 900 and 1200 nm, preferably just over 1000 nm, are preferably used here.

The welding sequence during laser welding is as follows:

Firstly, the connecting elements are positioned by means of a device on the workpiece surface to be joined, for example on the end face of a timing gear in end-pressed crankshaft or camshaft assemblies or in the timing drive of internal combustion engines, and are loaded with a defined force. This pressing force is intended to ensure that the connecting element lies flat on the joining surface of the workpiece, for example on the end face of the timing gear. This is followed by the setting of the weld points, preferably by means of the remote or mirror method. In the case where the connecting element is formed as a friction-increasing perforated disk, it has been found that a number of weld points of 3-7, set at equal intervals on the surface of the connecting element, is satisfactory for the disk diameters that are customary today.

It has surprisingly been found that, during welding by means of a heat-conducting welding method, such as laser welding, when welding the thin foils as connecting elements on porous base materials on which a deep welding effect does not occur on account of their porous structure, a welded connection can nevertheless be achieved with adequate strength.

The previously applied pressing force is very advantageous to achieve a welding gap that is as small as possible between the connecting element and the base body, which in turn is decisive for good weld point quality.

The pressing force preferably lies in the range from 20 to 100 N, more preferably at approximately 50 N.

A further possible welding method is resistance spot welding, in which the metal workpiece and the connecting element are pressed together at a point by two opposite electrodes. A welding current is introduced through the electrodes. The melting of the base material takes place at the location of greatest electrical resistance, that is to say generally at the transition between the metal workpiece and the connecting element. The electrodes generally consist of copper or copper alloys, since these materials conduct current and heat very well.

The electrodes in resistance spot welding preferably have a diameter of approximately 20 mm. The upper electrode, which presses onto the friction foil, has a convex tip diameter of preferably 3 mm, while the lower electrode, which contacts the base material, has a tip diameter of, for example, 6 mm. This allows the current flow and the current path to be adapted to components of extremely different thicknesses, the connecting element (thin foil) and the workpiece to be joined (thick).

For resistance welding, an uneven number of weld points, preferably 3-7 weld points, are likewise preferably used, to help to achieve concentricity during later use.

The connecting element used in the case of the method according to the invention or the component according to the invention comprises as base material a thin metal foil, preferably with a thickness of ≤0.2 mm, more preferably of 0.1 to 0.2 mm. According to a preferred embodiment, the metal foil has an intrinsic strength which at least matches the intrinsic strength of the workpieces to be joined. The connecting element used according to the invention preferably corresponds to a connecting element known from EP 0 961 038. Therefore, reference can be made to EP 0 961 038 for the possibilities of refinement of the metal foils, hard material particles and metallic binding layer.

Coated thin steel sheets, known as friction foils, are used in particular as the connecting element according to EP 0 961 038 B1. Steels are preferably used as the base material for the friction foil, in particular spring-elastic or flexurally elastic steels, with particular preference with a tensile strength in the range of 350-1850 N/mm$^2$, still more preference of 800-1600 N/mm$^2$. The steel sheet used for the connecting element preferably has a thickness of 0.1-0.2 mm. Thicker coated steel sheets can also be welded, but may lead to the total dimensional tolerance of a subassembly being exceeded, which would necessitate structural modifications of said subassembly.

The friction foils are provided with a coating which consists of a metallic binding layer in which hard particles are incorporated. The hard particles preferably consist of a material with a resistance to pressure and shearing that exceeds that of the workpieces to be joined. The coating preferably takes place on both sides. The hard particles are preferably selected from the group comprising carbides, nitrides, borides, diamond, $SiO_2$ and $Al_2O_3$, preferably from the group comprising diamond, silicon carbide and boron carbide. The hard material particles preferably have grain sizes between 6 and 80 μm, more preferably an average grain size $D_{50}$ in the range of 8-35 μm. With particular preference, hard particles with an average grain size of 10 to 20 μm are used. The determination of the grain size takes place in a known way by means of laser diffraction, for example with a device from the CILAS company (CILAS 1064) on solid material dispersions.

According to EP 0 961 038, the metallic binder phase preferably has a strength which corresponds at least to that of the surfaces of the workpieces that are to be joined. Particularly preferred as the metallic binding layer is an electrotechnically (galvanotechnically) produced layer of chemical nickel. Diamond particles of an average grain size $D_{50}$ in the range of 8-35 μm are particularly preferred as hard material particles. More preferably, the metallic binding layer has a thickness which is less than the average grain size of the hard material particles.

The fixing according to the invention of a friction-increasing connecting element may be carried out on base bodies of a wide variety of metal materials that can be welded by the methods described. To be mentioned in particular as suitable materials or materials that are relevant in the corresponding applications are cast materials, steel, aluminum and sintered metals. The structural materials that are customary in machine and automobile construction, gray cast iron, steel, aluminum and sintered steel, should be mentioned in particular.

A suitable strength testing method for the welded connections produced according to the invention is the cross tension test. The cross tension test is a destructive test that is used particularly whenever optimum setting values for a specific welding task are to be determined on test welds under conditions that are as similar to production conditions as possible. The functional procedure is such that the clamp in which the test piece is restrained is loaded by a constant force from above by the testing machine. Since the load applied by the testing machine (force transducer up to 5 kN) is increased by the dead weight of the clamp and the test piece, a corrective calculation of plus 4 N is made, corresponding to the weight of the clamp and the test piece. Then the testing machine is moved downward at a rate of 3 mm/min by means of the ram standing on the base plate. Failure of the specimens usually occurs by one weld point after the other failing; only in isolated cases do a number of weld points fail simultaneously.

The pulling-off force depends not only on the joining method but also on the number and diameter of the joints and, for example in the case of 3 joints, is preferably 10 to 200 N.

Connections obtained by resistance spot welding (pressure welding methods) have the greatest strength. Among the reasons for this greater strength in comparison with the other welding methods are the mechanical loading by the electrodes and the larger weld points, which have a diameter of approximately 3 mm. As a result, an extended cross-sectional area, which withstands greater loading, is obtained. On the other hand, however, on account of the larger weld points, the eruption of material is also greater and the area influenced by the welding is larger.

Connections of average strength are obtained by laser beam welding processes (fusion welding), it being possible for the weld points to be welded in the lap or parallel joint. The diameters of the weld points produced in this way correspond to the diameter of the laser beam.

The laser welding method is preferred, since smaller weld points are possible here in comparison with resistance spot welding, so that the damage to the friction foil is less, while the bond strength is still comparatively high.

Apart from welds in the lap or parallel joint, the weld points may also be made in the form of a fillet weld (T joint) and in the butt joint. The various possible types of joint or embodiments and positions during welding allow the fixing/joining method according to the invention to be adapted to the surrounding construction.

The surface roughness and cleanness of the surface play a greater role in the case of laser beam welding than in the case of resistance spot welding. The depth of roughness depends on the grain size used of the embedded hard particles on the friction foil and is preferably at an $R_z$ value of below 30 µm, but may also be above that.

It has surprisingly been found that, in spite of the increased application of material at the weld points, when components according to the invention are used in the screwed and assembled state, a greater torsional torque can be transmitted than with the conventionally inserted connecting elements, as also illustrated by the following examples.

BRIEF DESCRIPTION OF THE ACCOMPANYING DRAWINGS

Figure 2A:
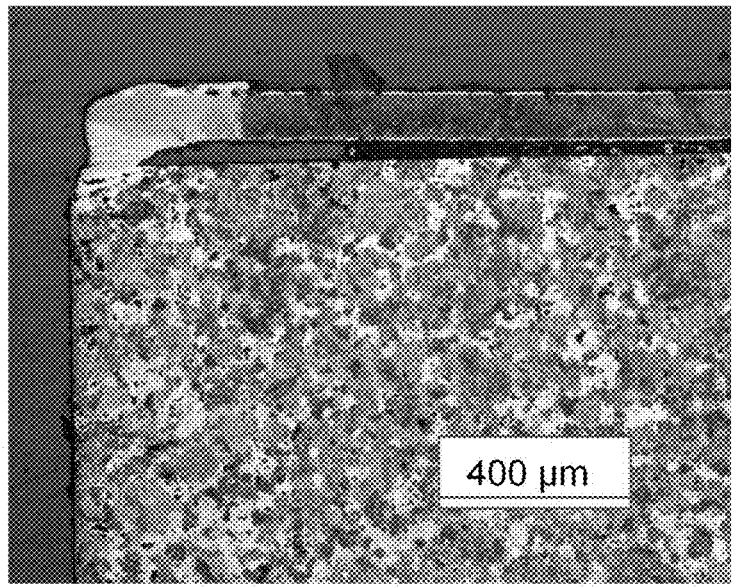
Figure 2B:
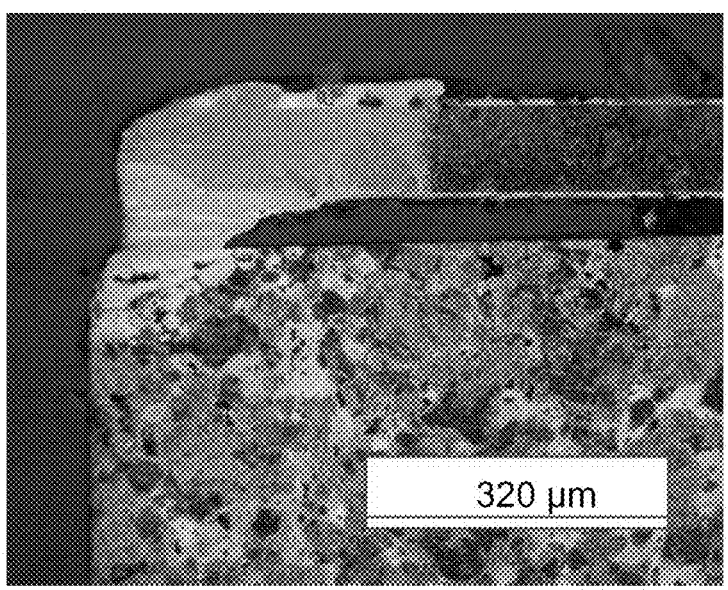

FIGS. 1a, 1b, 1c and 1d show optical micrographs of a microtomed section of the laser welding carried out in example 1 (lap joint) in 100, 200, 500 and 1000 fold magnification;

FIGS. 2a, 2b and 2c show optical micrographs of a microtomed section of the laser welding carried out in example 2 (corner joint) in 100, 200 and 500 fold magnification.

EXAMPLES AND COMPARATIVE EXAMPLES

The following examples and comparative examples serve for the further explanation of the invention.

Example 1

Laser Welding within Functional Area

To produce a fixed connecting element according to the invention, firstly annular perforated disks with an outside diameter of 27 mm, an inside diameter of 15 mm and a thickness of 0.1 mm are coated by the method known from EP 0 961 038.

The disks were punched from a spring band steel C75S QT with a strength of 1200-1400 N/mm². This was followed by coating of the disks, diamond particles with an average diameter of 10 µm being embedded in a binding layer comprising chemical nickel with a thickness of approximately 6 µm. Subsequently, heat treatment was performed at 150° C. over 2 hours to improve the adhesion of the layer of chemical nickel. The area coverage of the disk surface determined by means of optical image evaluation was 12±1%.

To produce a component according to the invention, the coated disks were applied to the surface of a test piece of Sint-D30 (sintered steel) by means of laser welding. The selection of the specimen substrate was made against the background that it is a customary material for the production of timing gears in the timing drive of internal combustion engines. The holding device for the welding operation was designed in such a way that 5 weld points could be set at intervals of in each case 72 angular degrees on a disk radius of approximately 11 mm. The laser beam was directed perpendicularly to the disk surface, the diameter of the laser beam was 0.5 mm. The laser weld points were investigated by means of microtomed section and laser scanning methods and scanning electron microscopy and documented.

The average pulling-off force, determined by means of the cross tension test, in the case of 3 weld points was 43.1 N.

The weld points were measured on prepared microtomed sections under a reflected light microscope. The region of interfusion is about 0.5 mm wide, which corresponds exactly to the diameter of the laser beam (see FIGS. 1a and 1b). The intensity of the laser beam was chosen such that the energy is coupled into the material well and melting takes place over the entire diameter of the laser beam. The thermal distortion causes the friction disk to lift off from the surface of the sintered workpiece by 0.06 mm, which corresponds to an overall height of 0.16 mm. The longest extent of the lifting-off of the disk from the weld point to resumed planar contact on the timing gear is reached after approximately 1.7 mm. In this case, the laser beam does not lead to any "crater formation" at the outer edges, but runs "downhill" to the center of the weld point. (Crater formations with eruption can be prevented or smoothed by targeted remelting of the joint.) Outside the melting zone, the coating appears to be intact.

Figure 1C:
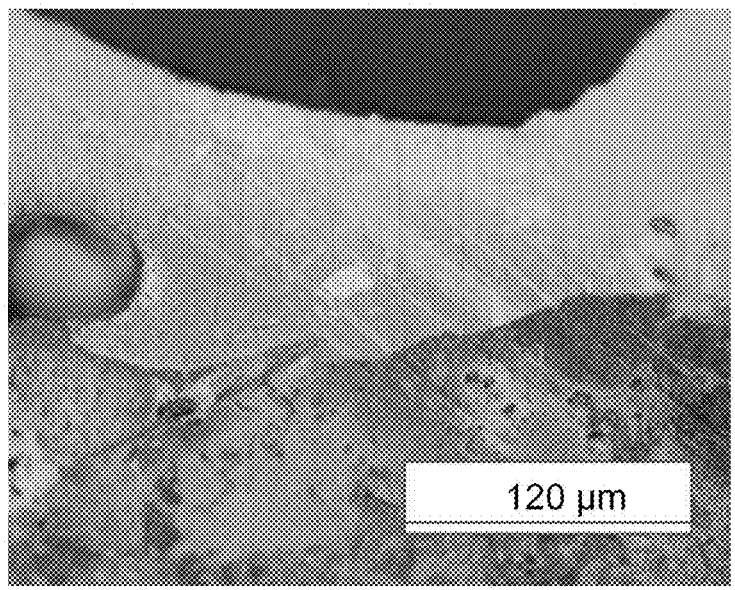
Figure 1D:
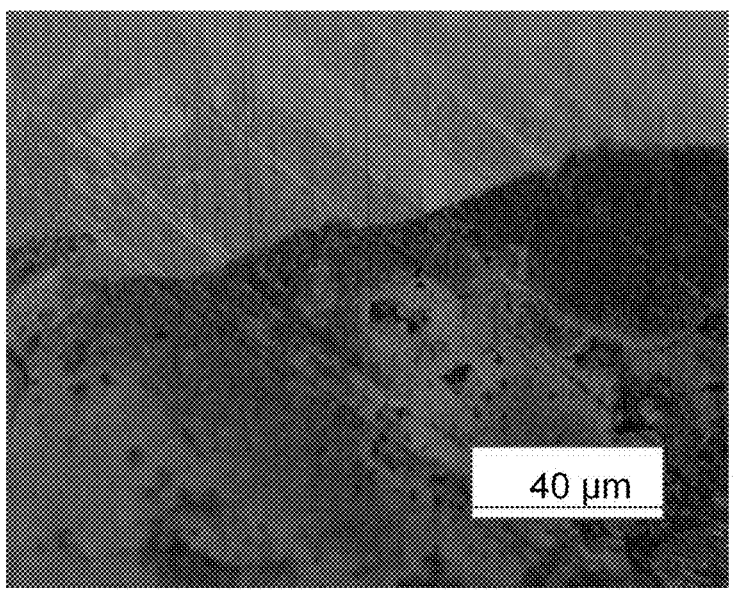

A 500 and 1000 fold magnification according to FIGS. 1c and 1d shows the homogeneous region of interfusion. With the exception of the pore formed, caused by the susceptibility to pores of the gas-containing base material (sintered steel), a connection of good quality was produced. The layer of chemical nickel and the diamonds are no longer evident.

Example 2

Laser Welding of Corner Joint

A configuration as a corner joint may be advisable, for example, if joining is intended in non-plane-parallel joints outside the functional area of engagement. Inclined/non-plane-parallel joints may increase the average friction radius, and rotational bending moments and/or shearing forces that are present can be compensated under load. The lap joint can then be deliberately avoided and the corner joint chosen as an alternative.

In FIGS. 2a and 2b, a laser weld configured as a corner joint is shown (microtomed section).

In the case of this type of joint, according to FIGS. 2a and 2b, the laser beam welds from the left, horizontally between the friction foil and the workpiece. The region of interfusion is 0.1 mm wide (FIG. 2a). The zone of influence of the disk, in which, inter alia, the layer of chemical nickel with the diamonds embedded in it is vaporized or melted, extends over 0.36 mm, in the case of a maximum elevation of the disk over the surface of the timing gear of around 0.17 mm. In the 200 fold magnification (FIG. 2b), the zone of thermal influence of the sintered metal, which is on average about 0.08 mm high and 0.12 mm wide, can be seen. Between the two connected components, the gap width is around 0.05 mm, which corresponds to half the thickness of the friction foil.

The melting at the direct contact area of the friction foil and the sintered material is very homogeneous (see FIG. 2c). The zone of thermal influence on the two components can be seen well.

The corner joint requires very exact positioning and dimensional accuracy in the joint of the parts being joined. Beyond the region of influence of the laser melting, after about 0.36 mm there is virtually no evident influencing of the friction-value-increasing layer of chemical nickel with embedded hard material particles on both sides of the disk (FIGS. 2a and 2b).

method according to the invention but only inserted, this test setup corresponding to the application described in EP 0 961 038.

For the purpose of verifying the result, three tests were carried out for each specimen pairing. The coefficients of static friction determined are presented in the following table.

Results of the Investigation into the Coefficient of Static Friction

Example 4 and Comparative Example

| | | Examination results, coefficient of static friction | | | |
|---|---|---|---|---|---|
| | | Sample pairing | | Coefficient of static friction, average μ | Coefficient of static friction, single values μ |
| Example 4 | Sint-D30 | Diamond-coated disc, welded onto Sint-D30 | 16 Mn Cr5 hardened | 0.63 | 0.62<br>0.63<br>0.63 |
| Comparative example | Sint-D30 | Diamond-coated disc, inserted | 16 Mn Cr5 hardened | 0.58 | 0.54<br>0.58<br>0.62 |

Example 3

Resistance Spot Welding with Sintered Steel as the Base Body

The connecting elements were produced as described in example 1. Sint-D30 was used as the base body. The welding was performed as resistance spot welding. The electrode pressing force was set to about 100 daN (=1000 N) and the welding current set to about 2.9-3.4 kA. The welding voltage sets itself automatically on the basis of the welding current and the electrical resistance of the subassembly.

The average pulling-off force, determined by means of the cross tension test, of the welded connection was 173.3 N.

Example 4

Determination of the Coefficient of Static Friction for the Connection of the Workpiece with a Fixed Connecting Element and the Workpiece to be Joined For the determination of the coefficient of static friction μ under torsional loading, the connecting elements according to example 1 fixed on the test piece Sint-D30 were paired together with hardened test pieces 16 MnCr5 and clamped against each other with a surface pressure of 100 MPa. A torsional moment was then applied by means of a hydraulic system until slipping of the connection occurred. Slipping is defined as the moment under which the connection has reached an angle of twist of 4°. The coefficient of static friction p could then be calculated from the torsional moment/angle of twist diagram determined.

Comparative Example

Determination of the Coefficient of Static Friction for the Connection of Two Workpieces with an Inserted Connecting Element The test from example 4 was repeated while retaining the setting parameters with the material pairing Sint-D30 and 16MnCr5, but the connecting element was not fixed by the Surprisingly, an approximately 10% higher coefficient of static friction and a much reduced standard deviation were achieved in the case of the welded connecting elements. This result was unexpected because laser welding leads to local lifting-off of the disk in the Sint-D30—diamond-coated disk connecting zone in the region of the weld points, the lifting-off taking place in an area of approximately 3 mm around the weld point. This causes a reduction in the effective disk area that is in engagement with the test piece, effective in the sense of increasing friction. The elevation in the region of the weld point found with the laser scanning method as a result of solidified melt leads to a further reduction in the effective area on the opposite side of the connection with respect to the test piece 16MnCr5, since the elevation likewise prevents the diamond-coated disk from lying completely flat on the connecting area of the test piece 16MnCr5.

That this at first seemingly unfavorable arrangement would produce a coefficient of static friction that is even much higher, with an advantageously reduced standard deviation, was not at all foreseeable.

The invention claimed is:

1. A method for fixing a connecting element on a metal workpiece configured to permit a friction-increasing, play-free, and reversible connection of workpieces to be joined, wherein the connecting element comprises a metal foil having hard material particles on its joining surfaces fixed on the metal foil by means of a metallic binding layer, the method comprising the steps of:
   positioning the connecting element on a joining surface of the metal workpiece;
   applying a pressing force to the connecting element to minimize a gap between the connecting element and the joining surface such that the connecting element lies flat on the joining surface; and thereafter
   forming a number of locally confined weld points to securely fix the connecting element on the metal workpiece, for purposes of assembly and transportation, by welding.

2. The method of claim 1, wherein the welding is performed by laser welding.

3. The method of claim 2, wherein an Nd:YAG solid-state laser welding unit is used for the laser welding.

4. The method of claim 2, wherein pulsed lasers with a wavelength of 900 to 1200 nm are used for the laser welding.

5. The method of claim 1, wherein the pressing force is 20 to 100 N.

6. The method of claim 1, wherein the welding is performed by resistance spot welding.

7. The method of claim 1, wherein the connecting element is fixed on the metal workpiece by an uneven number of weld points.

8. The method of claim 7, wherein the number of weld points is 3, 5, or 7.

9. The method of claim 1, wherein the metal foil of the connecting element has a thickness of ≤0.2 mm.

10. The method of claim 9, wherein the thickness is 0.1-0.2 mm.

11. The method of claim 1, wherein the metal foil of the connecting element is a spring-elastic steel foil having a tensile strength of 350-1850 N/mm$^2$.

12. The method of claim 11, wherein the spring-elastic steel foil has a tensile strength of 800-1600 N/mm$^2$.

13. The method of claim 1, wherein the hard material particles of the connecting element are selected from the group consisting of: carbides, nitrides, borides, diamond, $SiO_2$ and $Al_2O_3$.

14. The method of claim 13, wherein the hard material particles of the connecting element are selected from the group consisting of: diamond, silicon carbide and boron carbide.

15. The method of claim 1, wherein the hard material particles of the connecting element have a grain size of 6 to 80 μm and an average grain size $D_{50}$ in the range of 8 to 35 μm.

16. The method of claim 1, wherein the metallic binding layer of the connecting element is a galvanotechnically produced layer of chemical nickel.

17. The method of claim 1, wherein the metallic binding layer of the connecting element has a thickness less than an average grain size of the hard material particles.

18. The method of claim 1, wherein the metal workpiece on which the connecting element is fixed consists of a cast material, steel, aluminum, an aluminum alloy or a sintered metal.

* * * * *